UNITED STATES PATENT OFFICE.

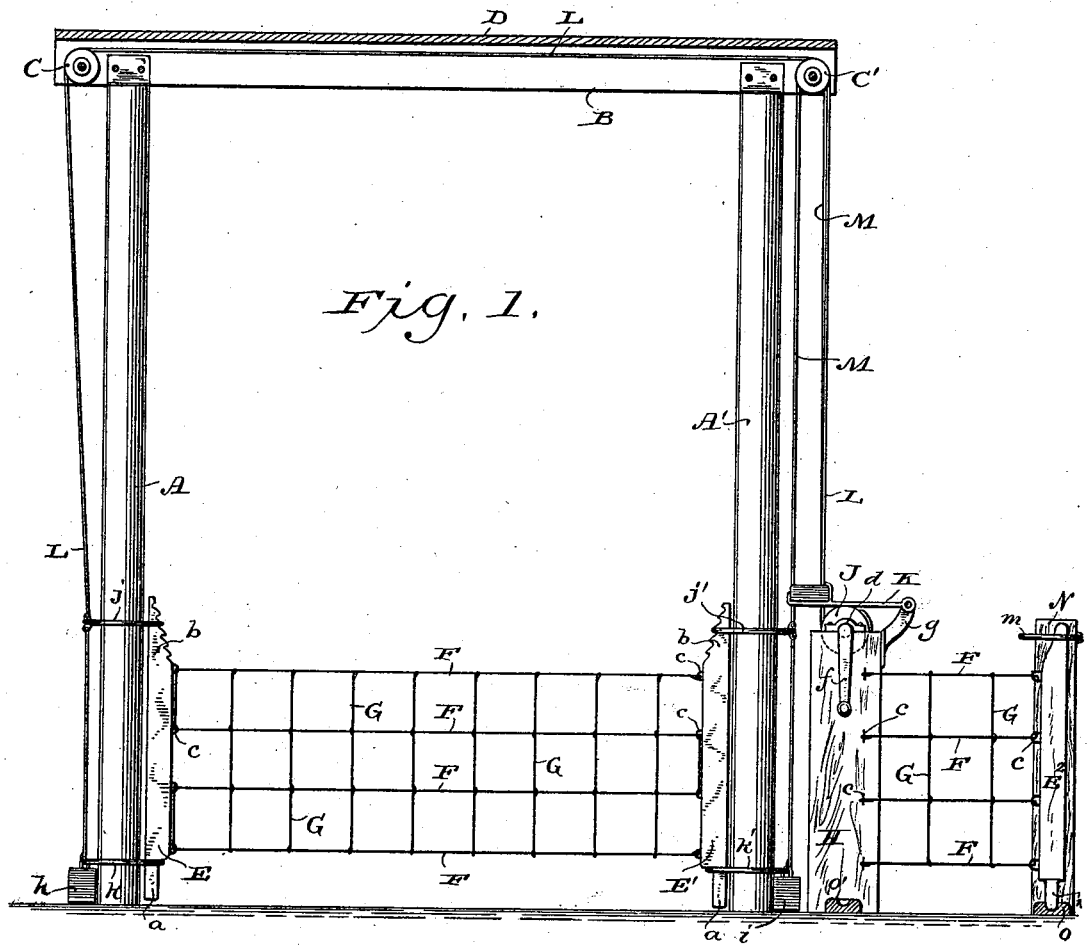

ALLISE NEUTASCHER, OF MENDOTA, ILLINOIS.

GATE.

SPECIFICATION forming part of Letters Patent No. 507,717, dated October 31, 1893.

Application filed December 10, 1888. Serial No. 293,160. (No model.)

*To all whom it may concern:*

Be it known that I, ALLISE NEUTASCHER, of Mendota, in the county of La Salle, and in the State of Illinois, have invented certain new and useful Improvements in Gates; and I do hereby declare that the following is a full, clear, and exact description thereof.

My invention relates to wire gates, and consists in certain peculiarities of construction, as will be set forth hereinafter, and pointed out in the claims.

In the drawings: Figure 1 is a side elevation, partly in section, showing two forms of my improved gate. Fig. 2 is a plan view of the same with the upper part of the taller gate removed. Figs. 3 and 4 are details illustrating the manner in which the wires forming the gate proper are connected together.

In Fig. 1, I show at the left, a gate with tall posts of the kind particularly adapted for railroad crossings and designed to be opened or closed vertically by a crank, and at the right of the same figure, I show a low-post swinging hand gate.

My wire gate is adapted for use with any style of post, but I have not deemed it necessary to show more than two styles.

A A' represent two tall guiding posts connected by cross-pieces B, at the top, which carry pulleys C C' at their ends outside of the line of said posts, and have a protecting cap-piece D, as shown.

E E' are the gate end-pieces, whose lower ends $a$, are shouldered, or reduced in size, and whose upper ends $b$ are also reduced, preferably at an angle as shown and provided with a series of notches or teeth.

F, F, F, are the horizontal wires of the gate, and G, G, G, the vertical wires. The former are stretched across from one end-piece E to the other end-piece E', and secured to said end-pieces in any suitable manner as by the staples $c\ c\ c$ shown. Ordinarily, I prefer to use only one continuous wire F to form all the horizontal "bars" of the gate, as shown at the left in Fig. 1, though I may, if preferred, employ separate pieces of wire for the parts F, as shown at the right of said figure. The vertical wires G of the gates are wound around the horizontal wires F in the manner shown in Figs. 3 and 4, that is, in single twists, first from one side (say the outside) of the gate, over, around and up, and then from the opposite or other side, over, around and up, and so on alternately, the wires being preferably stretched very tight in the process of winding or twisting them to place, which makes the gate light and strong, but flexible.

H, I, are two short posts, in line with each other, and provided with bearings or boxes $d$ $d$ for the shaft or axle $e$ of the windlass-roller J, said shaft having a crank $f$ at each end, and the post H has pivoted to any suitable part thereof (such as the lug $g$) a weighted arm K, forming a brake, which rests on the roller J, to retard its movement. From the roller there extend two cords, one L, passing up and over the pulley C' and across to and over pulley C (under cap D) and down alongside post A, to the counter-balance $h$, while the other cord M, extends up and over pulley C', also, and then down, alongside post A', to counterbalance $i$. The cord L carries two rings or loops $j$ and $k$, both encircling the post A and the former engaging with the upper part $b$ of the gate end-piece E, while the latter engages with the lower part $a$, of said end-piece, and the cord M carries two similar rings or loops $j'$ and $k'$ correspondingly located. Hence, to raise the gate, it is only necessary to turn one of the cranks $f$ and the cords L M will wind on the roller J, and as the rings $k\ k'$ bear against the shouldered lower ends of the gate end-pieces the gate will be drawn up, the weighted brake K on the roller J, and the counter-balances $h$, $i$, serving to keep the gate at whatever elevation it may have been raised to, while a reverse motion of the crank will immediately lower the gate. By reason of the inclined notched upper surfaces of the gate end-pieces E E' the gate can always be kept tightly to place between the guide-posts A A', and my gate is capable of use, at any time as a swing-gate as either the rings $j\ k$, or the rings $j'\ k'$ may be utilized as the hinges, and the other pair of rings slipped off the upper and lower ends of their adjacent end-piece when the gate may be readily swung around.

The simplest form of my gate is shown, at the right in Fig. 1, when instead of an extra end-piece secured by ring or loop hinges, as just described, to another post, I may simply drive staples $c\ c$ into a post (H), and form the hinges by looping the adjacent ends of the horizontal wire or wires F around said staples, the other ends of said wires F being secured, in any suitable manner (as by similar staples c) to an end-piece (E²) which may be secured, when the gate is shut, in any ordinary manner, as by a loop or ring m on another adjacent post or timber N, or by forming the lower end of the gate end-piece into a pin or point n, and dropping it into a suitable socket o, or both, and I may place a similar socket o' at the proper point to receive and hold the lower end of the gate end-piece E² when the gate is open, if desired. Of course, this simple form of gate might be secured in any other suitable manner, as by a button, bolt or latch, and I have merely illustrated simple, cheap, and effective means for accomplishing this purpose.

Having thus fully described my invention, what I claim as new, and desire to secure by Letters Patent, is—

1. In a gate, the combination with the end-pieces, of a wire or wires stretched horizontally from one end-piece to the other, and a series of vertical wires extending from the lower to the upper horizontal wire-section, each vertical wire secured to all the horizontal wire-sections by a series of single twists or turns, alternately from opposite sides of the successive horizontal sections, substantially as set forth.

2. In a gate, the combination with tall guide-posts connected by cross-pieces at the top carrying pulleys at their ends, inflexible end-pieces located between the guide posts, and adjacent thereto, and connected by a net-work of wires, said end-pieces having reduced lower ends, and reduced notched upper ends, a suitably supported windlass-roller, cords connected thereto, and passing up over said pulleys and down alongside said guide posts and carrying counterbalances at their free ends, and rings or loops secured to said cords, and encircling said guide-posts and the reduced ends of said end-pieces, substantially as set forth.

3. In a gate, the combination with a stationary independent post, of end-pieces connected by series of wires, forming the gate proper, the outer end-piece of said gate having an inclined serrated or notched upper end, and a movable ring or loop passing over said independent post and said outer end-piece and adjustably uniting the two together, substantially as set forth.

In testimony that I claim the foregoing I have hereunto set my hand, at Mendota, in the county of La Salle and State of Illinois, in the presence of two witnesses.

ALLISE NEUTASCHER.

Witnesses:
A. P. GERLACH,
GEO. B. EDWARDS.